(12) United States Patent  
Coutts et al.

(10) Patent No.: US 12,451,981 B1  
(45) Date of Patent: Oct. 21, 2025

(54) APPARATUS, SYSTEM, AND METHOD FOR CALIBRATING IMPEDANCE MEASUREMENTS FOR CLOSED-LOOP TUNING OF WIRELESS DEVICES

(71) Applicant: Meta Platforms Technologies, LLC, Menlo Park, CA (US)

(72) Inventors: Gordon Coutts, Woodinville, WA (US); Nivethitha Jayaraj, San Jose, CA (US); Nil Apaydin, Kirkland, WA (US); Liang Han, Sunnyvale, CA (US); Jayakrishnan Vijayamohanan, Albuquerque, NM (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 504 days.

(21) Appl. No.: 18/065,924

(22) Filed: Dec. 14, 2022

(51) Int. Cl.
  *H04B 17/00* (2015.01)
  *H04B 17/21* (2015.01)

(52) U.S. Cl.
  CPC .................................. *H04B 17/21* (2015.01)

(58) Field of Classification Search
  CPC ...... H04B 17/11; H04B 17/103; H04B 17/15; H04B 17/21; H04B 17/22; H04B 17/294
  See application file for complete search history.

(56) References Cited

U.S. PATENT DOCUMENTS

| | | | |
|---|---|---|---|
| 7,489,145 B2 * | 2/2009 | Matoba | H01J 37/32935 324/707 |
| 10,088,860 B2 * | 10/2018 | Choi | H02J 3/18 |
| 11,101,109 B2 * | 8/2021 | Morii | H03H 7/38 |

* cited by examiner

*Primary Examiner* — Tuan Pham  
(74) *Attorney, Agent, or Firm* — Foley & Lardner LLP

(57) ABSTRACT

A system comprising (1) a tuner configured to tune a radio and (2) a controller communicatively coupled to the tuner, wherein the controller is configured to (1) select a tuner code to apply to the tuner based at least in part on telemetry data indicative of a certain use-case scenario and (2) cause the tuner to tune the radio by applying the tuner code to achieve a certain state of the radio. Various other apparatuses, devices, systems, and methods are also disclosed.

20 Claims, 10 Drawing Sheets

APPARATUS, SYSTEM, AND METHOD FOR CALIBRATING IMPEDANCE MEASUREMENTS FOR CLOSED-LOOP TUNING OF WIRELESS DEVICES

BRIEF DESCRIPTION OF DRAWINGS

The accompanying drawings illustrate a number of exemplary embodiments and are parts of the specification. Together with the following description, the drawings demonstrate and explain various principles of the instant disclosure.

Figure 1:
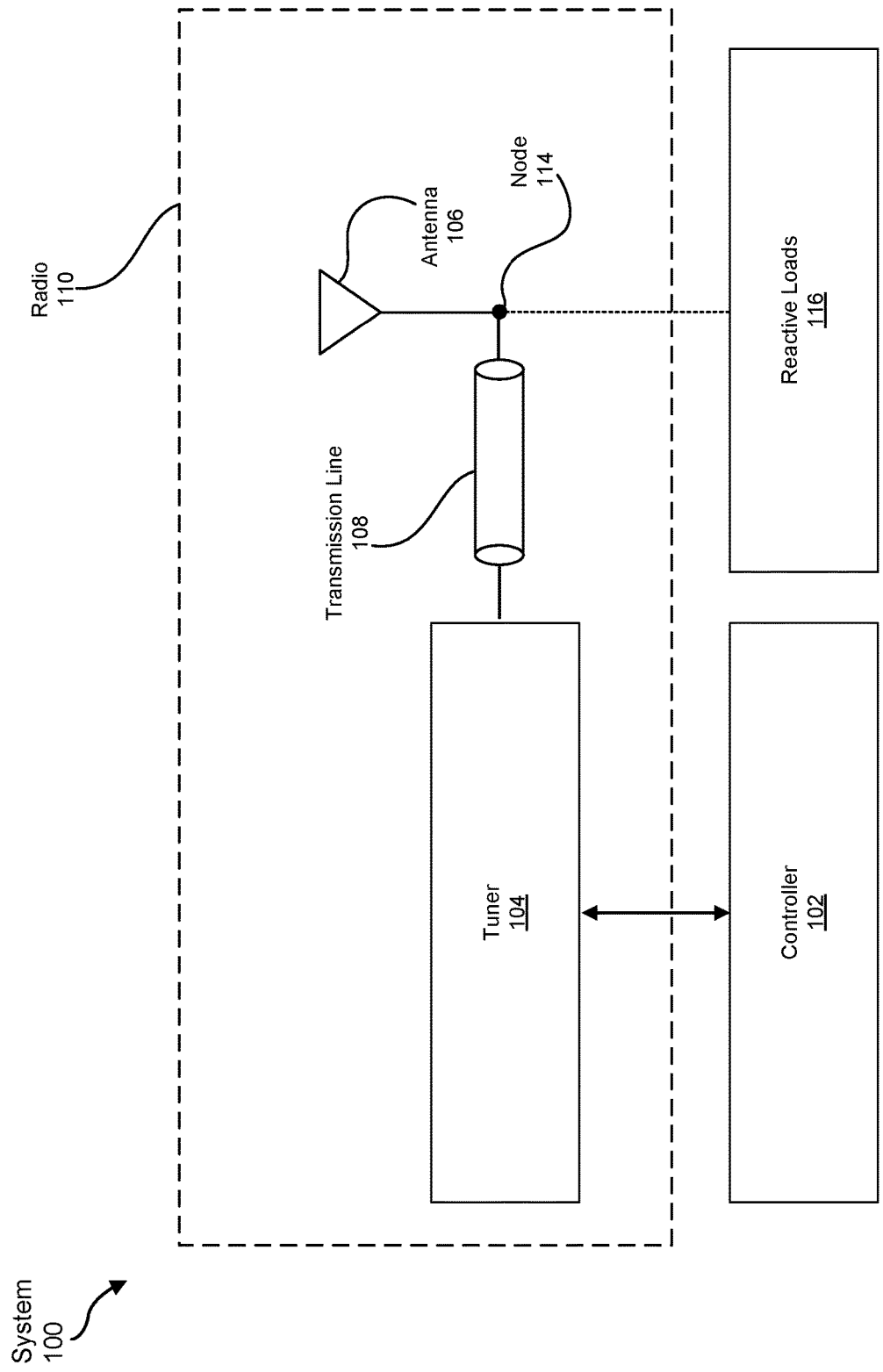
FIG. 1 is a block diagram of an exemplary system capable of calibrating impedance measurements for closed-loop tuning of wireless devices according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to apparatuses, systems, and methods for calibrating impedance measurements for closed-loop tuning of wireless devices. As will be explained in greater detail below, these apparatuses, systems, and methods may provide numerous features and benefits.

In some examples, wireless devices may implement and/or incorporate radios and/or antennas that are characterized by non-linear load impedances. In such examples, many features and/or use-case scenarios may alter and/or affect the load impedance of the radios and/or antennas in these wireless devices. For example, fluctuations in temperature, power, and/or frequency may contribute to and/or cause the radios and/or antennas in these wireless devices to exhibit non-linear characteristics. Additionally or alternatively, the way in which users grip and/or hold wireless devices may also contribute to and/or cause the load impedance of the radios and/or antennas to change non-linearly.

In past calibration schemes, wireless device manufacturers may have compensated the load impedances of radios and/or antennas by calibrating to open, short, and/or load (OSL) standards. Unfortunately, such OSL calibration may be ineffective and/or deficient for non-linear wireless devices. To improve calibration of these non-linear wireless devices beyond the OSL standards, wireless device manufacturers may apply and/or implement a non-linear calibration scheme that involves various sets of standardized impedance points that span 180 degrees from one another along a Smith chart. Accordingly, the impedance points involved in the non-linear calibration scheme may include and/or represent complex loads that are each comprised of a resistive component and a reactive component, as opposed to purely resistive loads.

In some examples, the wireless device manufacturers may calculate correction coefficients for the non-linear wireless devices by measuring the load impedances across the sets of standardized impedance points. In such examples, the wireless device manufacturers may then average the correction coefficients across the different sets of standardized impedance points. By doing so, the wireless device manufacturers may effectively spread and/or distribute the non-linear error measured across the standardized impedance points throughout the full range of load impedances for the radios and/or antennas. Accordingly, this calibration scheme may effectively spread and/or distribute the non-linear error measured via the sets of standardized impedance points more evenly across the Smith chart to improve calibration of the radios and/or antennas and thus facilitate better performance by the wireless devices.

The following will provide, with reference to FIGS. 1-4, detailed descriptions of exemplary devices, systems, components, and corresponding implementations for calibrating impedance measurements for closed-loop tuning of wireless devices. In addition, detailed descriptions of methods for calibrating impedance measurements for closed-loop tuning of wireless devices will be provided in connection with FIG. 5. The discussion corresponding to FIGS. 6-10 will provide detailed descriptions of types of exemplary artificial-reality devices, wearables, and/or associated systems capable of calibrating impedance measurements for closed-loop tuning of wireless devices.

FIG. 1 illustrates a portion of an exemplary system 100 capable of calibrating impedance measurements for closed-loop tuning of wireless devices. In some examples, system 100 may include and/or represent a radio 110 and a controller 102. In one example, controller 102 may be communicatively coupled to radio 110. In this example, radio 110 may include and/or represent a tuner 104, a transmission line 108, and/or an antenna 106. For example, transmission line 108 may be communicatively coupled between tuner 104 and antenna 106.

In some examples, a plurality of reactive loads 116 may be applied and/or communicatively coupled to radio 110 to facilitate and/or support measuring and/or testing the impedances of radio 110, antenna 106, and/or controller 102 for calibration purposes. For example, reactive loads 116 may be temporarily coupled between transmission line 108 and antenna 106 at a node 114 during a testing and/or calibration process. In this example, one of reactive loads 116 may be applied to and/or implemented on radio 110 during one phase of the testing and/or calibration process, and then another one of reactive loads 116 may be applied to and/or implemented on radio 110 during another phase of the testing and/or calibration process. Accordingly, the testing and/or calibration process may involve cycling and/or sweeping through reactive loads 116 one at a time to measure the impedance looking into radio 110 and/or antenna 106 at node 114 under different parameters.

In some examples, one or more of reactive loads 116 may include and/or represent a purely reactive load. For example, one or more of reactive loads 116 may include and/or represent only a reactive component, such as inductive reactance and/or capacitive reactance. In this example, a purely reactive load may correspond to and/or represent a position and/or point along the outer perimeter of the Smith chart.

In other examples, one or more of reactive loads 116 may include and/or represent a load comprised of a resistive component and a reactive component. For example, one or more of reactive loads 116 may correspond to resistive impedance represented by a real number on the Smith chart and a reactive impedance represented by an imaginary number on the Smith chart. In this example, such loads may map and/or be superpositioned to a point inside the outer perimeter of the Smith chart.

In some examples, controller 102 may inject and/or direct a time-varying signal into radio 110 while reactive loads 116 are applied to radio 110. For example, controller 102 may inject and/or direct a time-varying signal into radio 110 while one of reactive loads 116 is applied to and/or implemented on radio 110. In this example, controller 102 may know, determine, and/or measure certain parameters and/or characteristics (e.g., amplitude and/or phase) of the time-varying signal being injected and/or directed into radio 110 while that reactive load is applied to and/or implemented on radio 110. The reactive load applied and/or implemented on radio 110 may cause and/or produce a reflection of the time-varying signal that bounces back and/or returns to controller 102. This reflection may result from a discontinuity and/or mismatch of impedances between transmission line 108 and the reactive load.

In some examples, controller 102 may determine and/or measure certain parameters and/or characteristics (e.g., amplitude and/or phase) of the reflection of that time-varying signal as it returns from the reactive load. In one example, controller 102 may determine and/or calculate the reflection coefficient of the time-varying signal and its reflection, which are sometimes referred to as the incident wave and the reflected wave, respectively. For example, the reflection coefficient may constitute and/or represent the complex ratio of the voltage of the reflection relative to the voltage of the time-varying signal (e.g., $$(e.g., \Gamma = \frac{Voltage_{Reflected}}{Voltage_{incident}} = \frac{Z_{Load} - Z_{Characteristic}}{Z_{Load} + Z_{Characteristic}}).$$

Additionally or alternatively, the reflection coefficient may constitute and/or represent the quotient of dividing the difference between the load impedance and the characteristic impedance of transmission line 108 by the sum of the load impedance and the characteristic impedance of transmission line 108 (e.g., $$(e.g., \Gamma = \frac{Z_{Load} - Z_{Characteristic}}{Z_{Load} + Z_{Characteristic}}).$$

In some examples, controller 102 may use this reflection coefficient to determine and/or calculate the impedance looking into radio 110 and/or antenna 106 at node 114. In one example, controller 102 may maintain and/or keep consistent the same parameters of the time-varying signal and/or test environment to properly characterize the load impedances of reactive loads 116. Examples of such parameters include, without limitation, the power level and/or amplitude of the incident wave, the frequency of the incident wave, the temperature of the test environment and/or circuitry, combinations or variations of one or more of the same, and/or any other suitable parameters that potentially affect the load impedance of radio 110 and/or antenna 106.

In some examples, controller 102 may calculate and/or compute the load impedances for each of reactive loads 116 at a specific frequency. For example, the load impedance may be calculated and/or computed using the relationship between the reflection coefficient and the load impedance $$(Z_{Load} = Z_0 \frac{1-\Gamma}{1+\Gamma}).$$

In this example, the load impedance may also be normalized to the characteristic impedance of transmission line 108, which is usually 50 ohms $$(Z_{Normalized\ Load} = \frac{i-\Gamma}{1+\Gamma}).$$

In some examples, controller 102 may inject and/or direct the same time-varying signal into radio 110 and/or antenna 106 while cycling and/or sweeping across reactive loads 116. Accordingly, controller 102 may be able to collect and/or gather data and/or information about load impedances across reactive loads 116 while maintaining the same parameters (e.g., amplitude and/or frequency) of the injected time-varying signal. In one example, controller 102 may then calculate and/or compute reflective coefficients for reactive loads 116 using the same time-varying signal. Additionally or alternatively, controller 102 may calculate and/or compute the raw load impedances for reactive loads 116 based at least in part on the reflective coefficients for reactive loads 116.

In some examples, controller 102 may determine and/or calculate the raw load impedances of reactive loads 116 for each frequency band of interest. For example, controller 102 may determine and/or calculate the raw load impedances of reactive loads 116 for an 800-megahertz frequency band. Additionally or alternatively, controller 102 may determine and/or calculate the raw load impedances of reactive loads 116 for a 1900-megahertz frequency band. In another example, controller 102 may determine and/or calculate the raw load impedances of reactive loads 116 for a 700-megahertz frequency band and/or a 1700-megahertz frequency band.

In some examples, reactive loads 116 may constitute and/or represent part of standard and/or reference. In such examples, controller 102 may be able to detect, calculate, and/or compute the amount of error present in the raw load impedances measured while reactive loads 116 are applied. For example, controller 102 may be configured and/or programmed to expect and/or know the impedance values for reactive loads 116 if radio 110 and/or antenna 106 were perfectively calibrated and/or ideal. In this example, controller 102 may calculate and/or compute the deviations between those ideal impedance values and the raw load impedance measurements.

In some examples, because radio 110 and/or antenna 106 are non-linear devices, the impedance error present in radio 110 and/or antenna 106 (e.g., the deviations between the ideal impedance values and the raw load impedance measurements) may vary across the Smith chart. For example, the impedance error present at 0.2+j0.5 on the Smith chart may vary from the impedance error present at 1.0–j2.0 on the Smith chart. In one example, controller 102 may compensate and/or account for the non-linear nature of radio 110 and/or antenna 106 by distributing the impedance error across the Smith chart. In certain implementations, this impedance error may be distributed and/or normalized arbitrarily across the Smith chart to improve the calibration of radio 110 and/or antenna 106. Controller 102 may perform these impedance-error distributions for each frequency band of interest.

In some examples, the impedance error may be introduced into system 100 by radio 110 and/or antenna 106. Additionally or alternatively, the impedance error may be introduced into system 100 by controller 102. For example, controller 102 may include and/or represent a radio-frequency (RF) integrated circuit (RFIC) that introduces non-linear aberrations and/or effects into the impedance measurements of radio 110 and/or antenna 106.

In some examples, controller 102 may determine and/or solve for one or more calibration coefficients capable of correcting the non-linear error distributed across the Smith chart. For example, controller 102 may apply and/or implement a curve-fitting algorithm that maps and/or models the load impedance error across and/or throughout the Smith chart. In this example, the curve-fitting algorithm may take the amount of error computed across and/or throughout the Smith chart as inputs. The curve-fitting algorithm may then render and/or output a representation, mapping, and/or model of the error distribution of radio 110, controller 102, and/or antenna 106. Examples of such a curve-fitting algorithm include, without limitation, Gauss-Newton algorithms, optimization algorithms, linear regression algorithms, non-linear regression algorithms, least-squares fitting algorithms, Levenberg-Marquardt algorithms, convolutional neural networks, recurrent neural networks, supervised learning models, unsupervised learning models, logistic regression models, decision trees, support vector machine models, Naive Bayes models, k-nearest neighbor models, k-means models, random forest models, combinations or variations of one or more of the same, and/or any other suitable models or algorithms capable of performing curve-fitting.

In some examples, the inputs and/or the output representation may be specific to a certain frequency band of interest. Accordingly, controller 102 may use the curve-fitting algorithm to render, create, and/or output multiple frequency-dependent models of the error distribution of radio 110 and/or antenna 106. Controller 102 may then apply one of those models of the error distribution to calibrate radio 110 and/or antenna 106, thereby compensating radio 110 and/or antenna 106 for the load-impedance error distribution of a given frequency band.

In some examples, the curve-fitting algorithm may render, create, and/or output one or more calibration coefficients that collectively model the non-linear error distributed across the Smith chart (e.g., by way of superposition). In one example, the curve-fitting algorithm may render, create, and/or output a set of orthogonal basis functions that effectively characterize the load-impedance error distribution of radio 110 and/or antenna 106 and enable controller 102 to correct and/or compensate for that load-impedance error distribution. For example, the curve-fitting algorithm may render and/or output a linear combination of Zernike polynomials (or alternatively Bessel functions) that enable controller 102 to accurately calibrate the impedance measurements of radio 102 and/or antenna 106.

In some examples, Zernike polynomials may be orthogonal and/or isometric to a unit disk. Accordingly, Zernike polynomials may serve as a suitable representation of non-linear errors in the measured impedances as translated to the Smith chart. In one example, odd Zernike polynomials may be represented and/or defined as $Z_n^m(\rho, \varphi) = R_n^m (\varphi \cos(m\varphi)$. Additionally or alternatively, even Zernike polynomials may be represented and/or defined as $Z_n^{-m}(\rho, \varphi) = R_n^m (\varphi \sin(m\varphi)$. In such polynomials, m and n may constitute and/or represent positive integers, $\varphi$ may constitute and/or represent the azimuthal angle, $\rho$ may constitute and/or represent the radial distance, and $R_n^m$ may constitute and/or represent radial polynomials. In certain implementations, the $R_n^m$ radial polynomials may be represented and/or defined as $$R_n^m(\rho) = \sum\nolimits_{k=0}^{\frac{n-m}{2}} \frac{(-1)^k (n-k)!}{k! \left(\frac{n+m}{2} - k\right)! \left(\frac{n-m}{2} - k\right)!} \rho^{n-2k}.$$

In some examples, controller 102 may calibrate radio 110 and/or antenna 106 to account and/or compensate for the calibration coefficients. For example, controller 102 may determine and/or compute one or more tuner settings for tuner 104 based at least in part on the model of the load-impedance error distribution rendered by the curve-fitting algorithm. In one example, controller 102 may convert and/or transform the calibration coefficients into tuner-compliant settings that, when applied, effectively tune and/or modify tuner 104 to achieve the desired calibration and/or correction for radio 110 and/or antenna 106. Additionally or alternatively, controller 102 may look up the corresponding tuner settings in a lookup and/or conversion table and then apply those tuner setting to tuner 104, thereby tuning and/or modifying tuner 104 to achieve the desired calibration and/or correction for radio 110 and/or antenna 106.

Upon completion of such calibration and/or correction, radio 110 and/or antenna 106 may perform and/or function better and/or more efficiently when operating in that frequency band. For example, this improved performance and/or efficiency may involve increased signal strength for radio 110 and/or increased throughput for radio 110. Additionally or alternatively, this improved performance and/or efficiency may extend the battery life of system 100.

In some examples, system 100 may include and/or represent any type or form of wireless and/or RF device. In one example, system 100 may include and/or represent a cellular phone and/or a tablet computer. In another example, system 100 may include and/or represent an artificial-reality device (e.g., a virtual-reality device, an augmented-reality device, a mixed-reality device, and/or a hybrid-reality device).

In some examples, controller 102 may include and/or represent any type or form of hardware-implemented processing device and/or component capable of interpreting and/or executing computer-readable instructions. Controller 102 may access, execute, and/or modify certain software modules to facilitate and/or support calibrating and/or correcting impedance measurements for closed-loop tuning of wireless devices. In one example, controller 102 may include and/or represent an RFIC incorporated in a wireless device. Additional examples of controller 102 include, without limitation, physical processors, Central Processing Units (CPUs), microprocessors, microcontrollers, Field-Programmable Gate Arrays (FPGAs) that implement softcore processors, Application-Specific Integrated Circuits (ASICs), Systems on a Chip (SoCs), integrated circuits, portions of one or more of the same, variations or combinations of one or more of the same, and/or any other suitable controller.

In some examples, tuner 104 may include and/or represent any type or form of hardware-implemented device and/or component capable of tuning radio 110 and/or antenna 106 to a specific frequency and/or range for reception and/or transmission. In such examples, tuner 104 may facilitate and/or support tuning antenna 106 to certain frequency bands, thus enabling antenna 106 to transmit and/or receive communications via different frequencies. In one example, tuner 104 may include and/or represent an impedance tuner and/or an aperture tuner.

Figure 2:
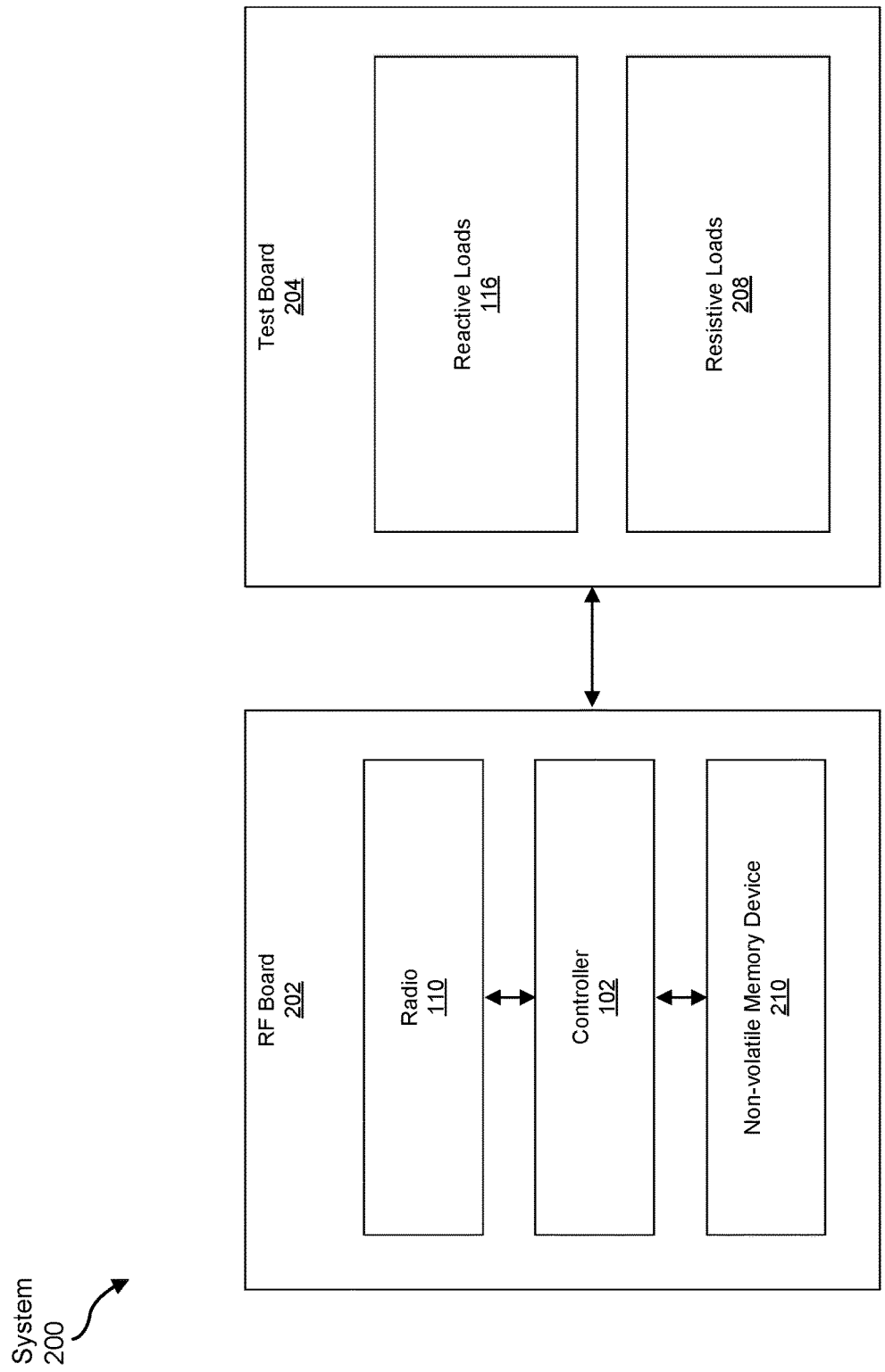
FIG. 2 is a block diagram of an exemplary system capable of calibrating impedance measurements for closed-loop tuning of wireless devices according to one or more embodiments of this disclosure.

FIG. 2 illustrates a portion of an exemplary system 200 capable of calibrating impedance measurements for closed-loop tuning of wireless devices. In some examples, system 200 may include and/or represent certain components and/or features that perform and/or provide functionalities that are similar and/or identical to those described above in connection with FIG. 1. As illustrated in FIG. 2, exemplary system 200 may include and/or represent an RF board 202 and/or a test board 204 communicatively coupled to one another. In some examples, RF board 202 may constitute and/or represent part of a wireless and/or RF device. In one example, RF board 202 may include and/or represent radio 110, controller 102, and/or non-volatile memory device 210. In this example, controller 102 may be communicatively coupled to radio 110 and/or non-volatile memory device 210.

In some examples, test board 204 may include and/or represent a circuit board and/or device capable of rendering, providing, and/or applying reactive loads 116 and/or resistive loads 208 to RF board 202. In one example, test board 204 may include and/or represent a circuit board that facilitates and/or supports switching through different reactive loads 116 and/or resistive loads 208. For example, test board 204 may include and/or represent an open-circuit standard or mode, a short-circuit standard or mode, and/or a 50-ohm standard or mode (which normalizes to 1 on the Smith chart). In this example, these standards and/or modes may collectively constitute and/or represent an OSL kit or calibrator.

In some examples, in addition to such an OSL standard, test board 204 may also include and/or represent different features, components, and/or devices that introduce different resistive values and/or different reactive values. For example, test board 204 may include and/or represent different inductive components (e.g., inductors) and/or capacitive components (e.g., capacitors) that introduce and/or impart certain reactive values into reactive loads 116. In one example, test board 204 may include and/or represent different resistive components (e.g., resistors) that introduce and/or impart certain resistive values into reactive loads 116 and/or resistive loads 208.

In certain implementations, test board 204 may include and/or represent a low-cost printed circuit board (PCB) with different lengths of transmission lines between the open-circuit and short-circuit terminations. In such implementations, the different lengths of transmission lines may affect and/or define the amount of resistance imparted by reactive loads 116 and/or resistive loads 208. Additionally or alternatively, the different lengths of transmission lines may affect and/or define the amount of reactance imparted by reactive loads 116.

In some examples, test board 204 may be connected to RF board 202 via an electrical cable (e.g., a press-fit cable). In such examples, an automated and/or manual process may cycle and/or sweep through reactive loads 116 and/or resistive loads 208 to measure the impedances imparted by reactive loads 116 and/or resistive loads 208 for calibration purposes. In one example, test board 204 may include and/or represent a Maury tuner, impedance tuner, and/or automated tuner that facilitates and/or supports the automated and/or manual process of cycling and/or sweeping through reactive loads 116 and/or resistive loads 208. In this example, test board 204 may perform the cycling and/or sweeping process in a lab environment to calibrate radio 110 prior to shipment and/or deployment of system 200 for customer use.

In some examples, controller 102 may store and/or maintain the calibration coefficients in non-volatile memory device 210. For example, controller 102 may calibrate and/or tune radio 110 to a certain frequency band by applying one or more tuner settings that correspond to one or more of the calibration coefficients for that frequency band. In one example, controller 102 may save and/or record the calibration coefficients and/or tuner settings in non-volatile memory device 210 to facilitate changing certain tuner settings and/or reverting back to the best tuner settings for a certain frequency band at a subsequent time. In this example, the calibration coefficients stored and/or maintained in non-volatile memory device 210 may enable controller 102 to compensate for certain non-linearities of radio 110 across the available and/or relevant frequency bands.

Figure 3:
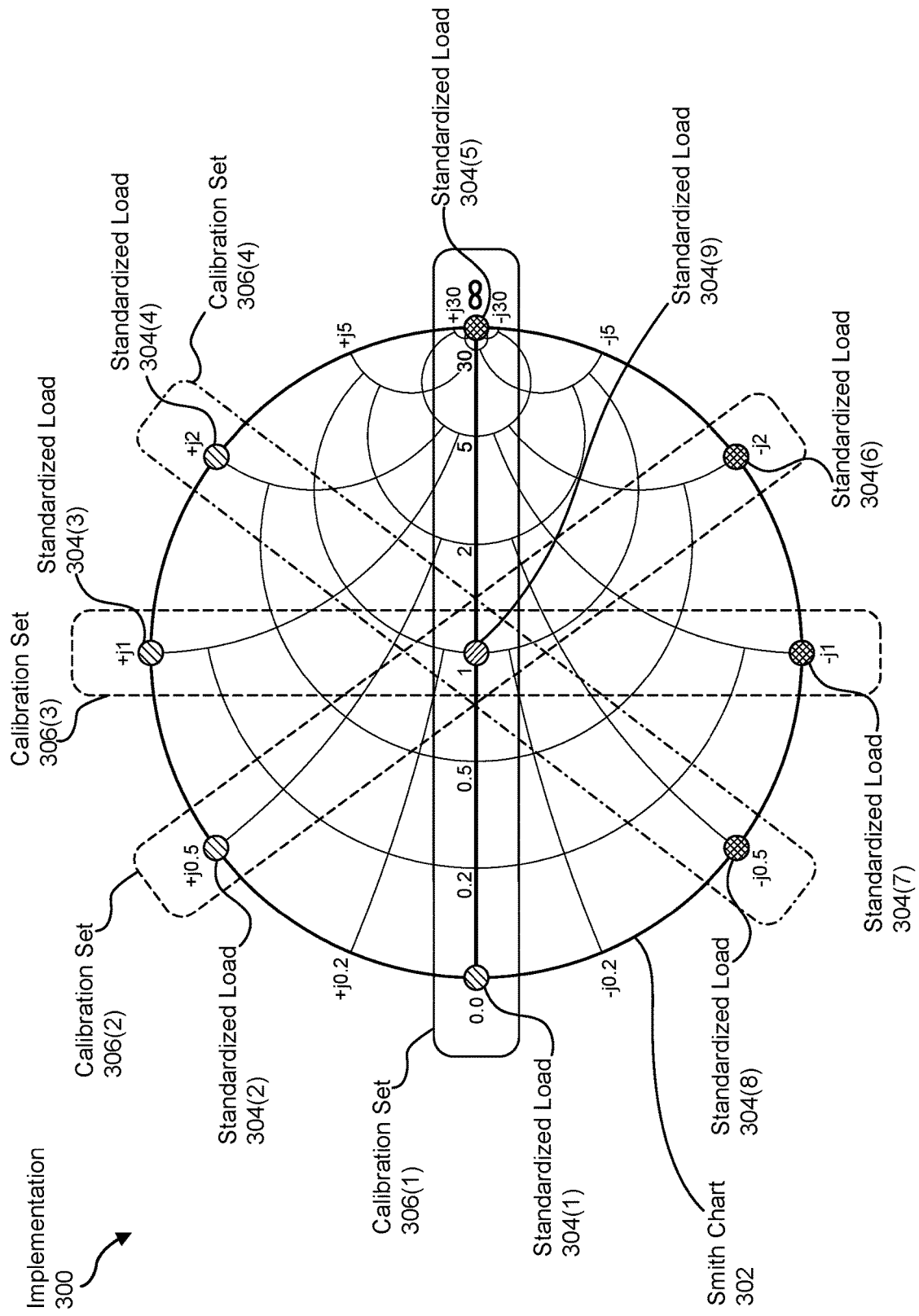
FIG. 3 is an illustration of an exemplary implementation involving sets of calibration points for measuring impedance errors of wireless devices across a Smith chart according to one or more embodiments of this disclosure.

FIG. 3 illustrates an exemplary implementation 300 that involves performing closed-loop tuning on a wireless device via one or more of reactive loads 116 and/or resistive loads 208. In some examples, implementation 300 may include and/or involve certain components and/or features that perform and/or provide functionalities that are similar and/or identical to those described above in connection with either FIG. 1 or FIG. 2. As illustrated in FIG. 3, exemplary implementation 300 may include and/or involve measuring impedances looking into radio 110 and/or antenna 106 when one or more of reactive loads 116 and/or resistive loads 208 are applied to RF board 202. In one example, these measured impedances may correspond to, constitute, and/or represent calibration sets 306(1), 306(2), 306(3), and/or 306(4). In this example, implementation 300 may present and/or overlay calibration sets 306(1)-(4) on a Smith chart 302 for illustrative and/or demonstrative purposes.

In some examples, calibration sets 306(1)-(4) may include and/or represent standardized loads and/or points whose reactances are ideally located and/or positioned on opposite sides of (e.g., 180-degrees apart on) the Smith chart. In one example, calibration set 306(1) may include and/or represent standardized loads 304(1), 304(9), and/or 304(5). In this example, standardized load 304(1) may include and/or represent a short-circuit standard or mode, and standardized load 304(5) may include and/or represent an open-circuit standard or mode. As illustrated in FIG. 3, standardized loads 304(1) and 304(5) may be located and/or positioned on opposite sides of the Smith chart. Additionally or alternatively, standardized load 304(9) may include and/or represent a 50-ohm standard or mode. Calibration set 306(1) may constitute and/or represent an OSL kit and/or calibrator comprised of resistive loads 208.

As another example, calibration set 306(2) may include and/or represent standardized loads 304(2), 304(9), and/or 304(6). In this example, standardized load 304(2) may include and/or represent a load impedance of 0.0+j0.5 ohms, and standardized load 304(6) may include and/or represent a load impedance of 0.0−j2.0 ohms. As illustrated in FIG. 3, standardized loads 304(2) and 304(6) may be located and/or positioned on opposite sides of the Smith chart.

As a further example, calibration set 306(3) may include and/or represent standardized loads 304(3), 304(9), and/or 304(7). In this example, standardized load 304(3) may include and/or represent a load impedance of 0.0+j1.0 ohms, and standardized load 304(7) may include and/or represent a load impedance of 0.0−j1.0 ohms. As illustrated in FIG. 3, standardized loads 304(3) and 304(7) may be located and/or positioned on opposite sides of the Smith chart.

As an additional example, calibration set 306(4) may include and/or represent standardized loads 304(4), 304(9), and/or 304(8). In this example, standardized load 304(4) may include and/or represent a load impedance of 0.0+j2.0 ohms, and standardized load 304(8) may include and/or represent a load impedance of 0.0−j0.5 ohms. As illustrated in FIG. 3, standardized loads 304(4) and 304(8) may be located and/or positioned on opposite sides of the Smith chart.

In some examples, controller 102 may inject and/or direct a time-varying signal of a certain frequency into radio 110 while each of standardized loads 304(1)-(9) are applied to radio 110. In such examples, standardized loads 304(1)-(9) may cause and/or produce a reflection of the time-varying signal that bounces back and/or returns to controller 102. This reflection may result from a discontinuity and/or mismatch of impedances between the standardized load under test and the corresponding transmission line. Although not necessarily illustrated in FIG. 3, various other standardized loads may also be applied to and/or implemented on radio 110 to increase the number of impedance points and/or strengthen the accuracy of the measured load-impedance error distribution across radio 110.

In some examples, controller 102 may calculate and/or measure the impedances of radio 110 when standardized loads 304(1)-(9) are applied to and/or implemented on radio 110. In one example, controller 102 may use the measured impedances to determine and/or calculate the amount of impedance error nonlinearly distributed across and/or imparted by radio 110. Additionally or alternatively, controller 102 may determine and/or solve for one or more calibration coefficients that represent this nonlinear impedance error of radio 110 by applying and/or implementing a curve-fitting algorithm.

In some examples, controller 102 may calculate and/or compute an average of the calibration coefficients. For example, controller 102 may determine and/or solve for a set of calibration coefficients for each of calibration sets 306(1)-(4). In this example, controller 102 may then average the calibration coefficients across calibration sets 306(1)-(4). By doing so, controller 102 may be able to render and/or produce a more even and/or consistent distribution of error across the impedances for radio 110. In one example, controller 102 may calibrate and/or tune radio 110 with tuner settings that account for the average of those calibration coefficients across the range of impedance values represented by the Smith chart.

Figure 4:
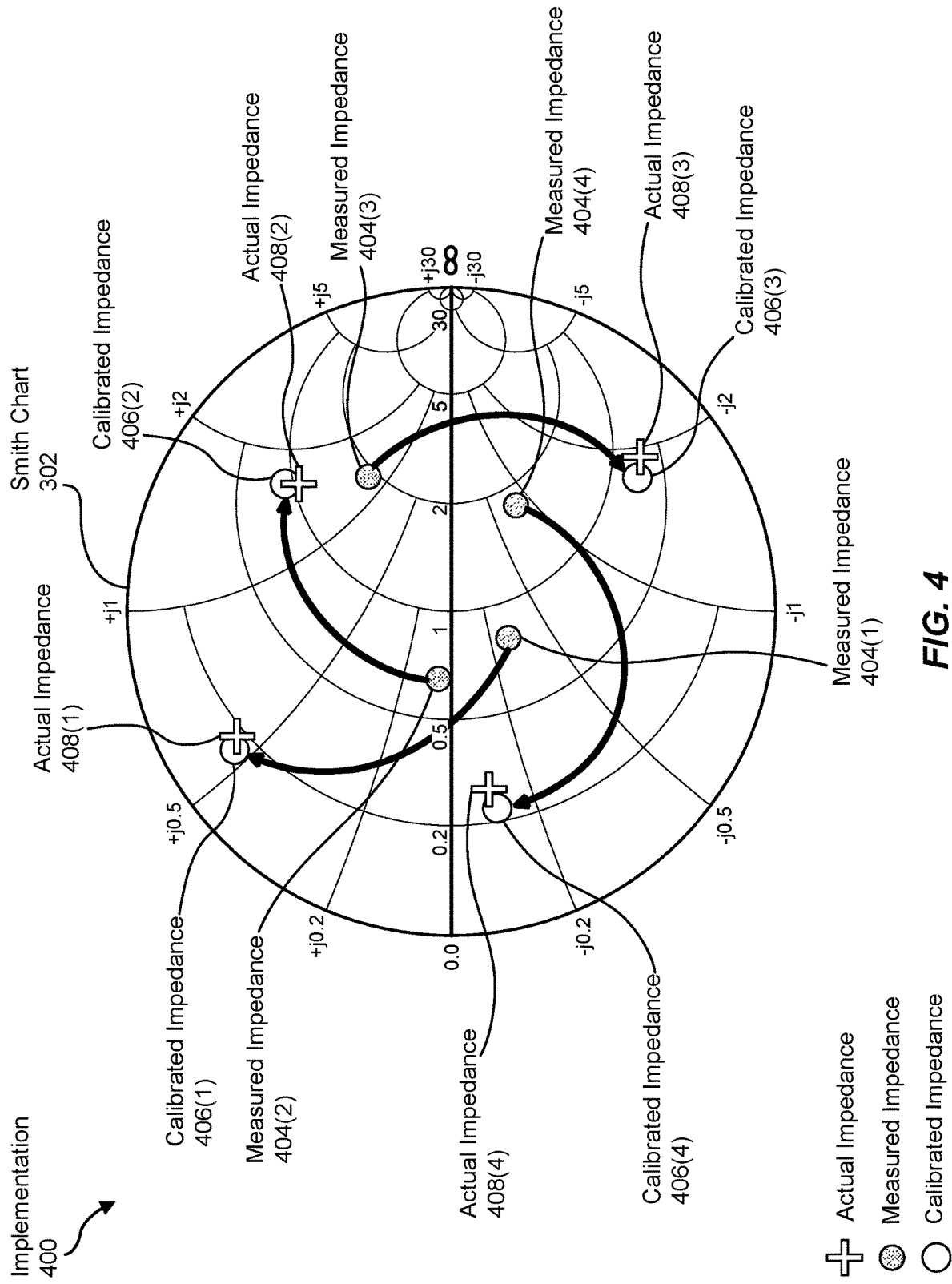
FIG. 4 is an illustration of an exemplary implementation demonstrating impedance values being compensated by calibration coefficients across a Smith chart according to one or more embodiments of this disclosure.

FIG. 4 illustrates an exemplary implementation 400 that involves correcting and/or compensating for non-linear impedance errors in a wireless device. In some examples, implementation 400 may include and/or involve certain components and/or features that perform and/or provide functionalities that are similar and/or identical to those described above in connection with any of FIGS. 1-3. As illustrated in FIG. 4, exemplary implementation 400 may include and/or involve correcting and/or compensating for impedances measured on radio 110 and/or antenna 106 by applying the calibration coefficients determined and/or calculated by controller 102.

As a specific example, controller 102 may determine and/or calculate a linear combination of four Zernike polynomials that serve as calibration and/or correction coefficients for a given frequency band on radio 110. In this example, the Zernike polynomials may be represented and/or defined as 0.01×(odd Zernike polynomial with m=1 and n=1)+0.014×(odd Zernike polynomial with m=2 and n=2)+0.011×(odd Zernike polynomial with m=0 and n=2)+0.010×(odd Zernike polynomial with m=1 and n=5). In one example, controller 102 may correct and/or calibrate measured impedances 404(1), 404(2), 404(3), and/or 404(4) by applying these Zernike polynomials, which effectively translate and/or transpose measured impedances 404(1)-(4) to calibrated impedances 406(1), 406(2), 406(3), and/or 406(4), respectively, on Smith chart 302.

In some examples, calibrated impedances 406(1)-(6) may include and/or represent an estimation of the actual impedances as rendered by the Zernike polynomials. For example, once radio 110 is tuned by the tuner settings corresponding to the Zernike polynomials, radio 110 may effectively translate and/or transpose measured impedances 404(1)-(4) to calibrated impedances 406(1)-(4), respectively, on Smith chart 302. In this example, calibrated impedances 406(1)-(4) may appear to be much closer and/or proximate to actual impedances 408(1), 408(2), 408(3), and/or 408(4), respectively, than measured impedances 404(1)-(4) on Smith chart 302. As a result of such tuning, radio 110 may perform and/or function better and/or more efficiently.

In some examples, the various devices and/or systems described in connection with FIGS. 1-4 may include and/or represent one or more additional circuits, components, and/or features that are not necessarily illustrated and/or labeled in FIGS. 1-4. For example, system 100 or 200 may also include and/or represent additional analog and/or digital circuitry, onboard logic, transistors, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support dynamic tuning based on detectable use-case scenarios. In certain implementations, one or more of these additional circuits, components, devices, and/or features may be inserted and/or applied between any of the existing circuits, components, and/or devices illustrated in FIGS. 1-4 consistent with the aims and/or objectives provided herein. Accordingly, the electrical and/or communicative couplings described with reference to FIGS. 1-4 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides electrical continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide electrical continuity from one of those two components to the other. In other words, the indirect coupling may include and/or incorporate at least one additional component between those two components.

Figure 5:
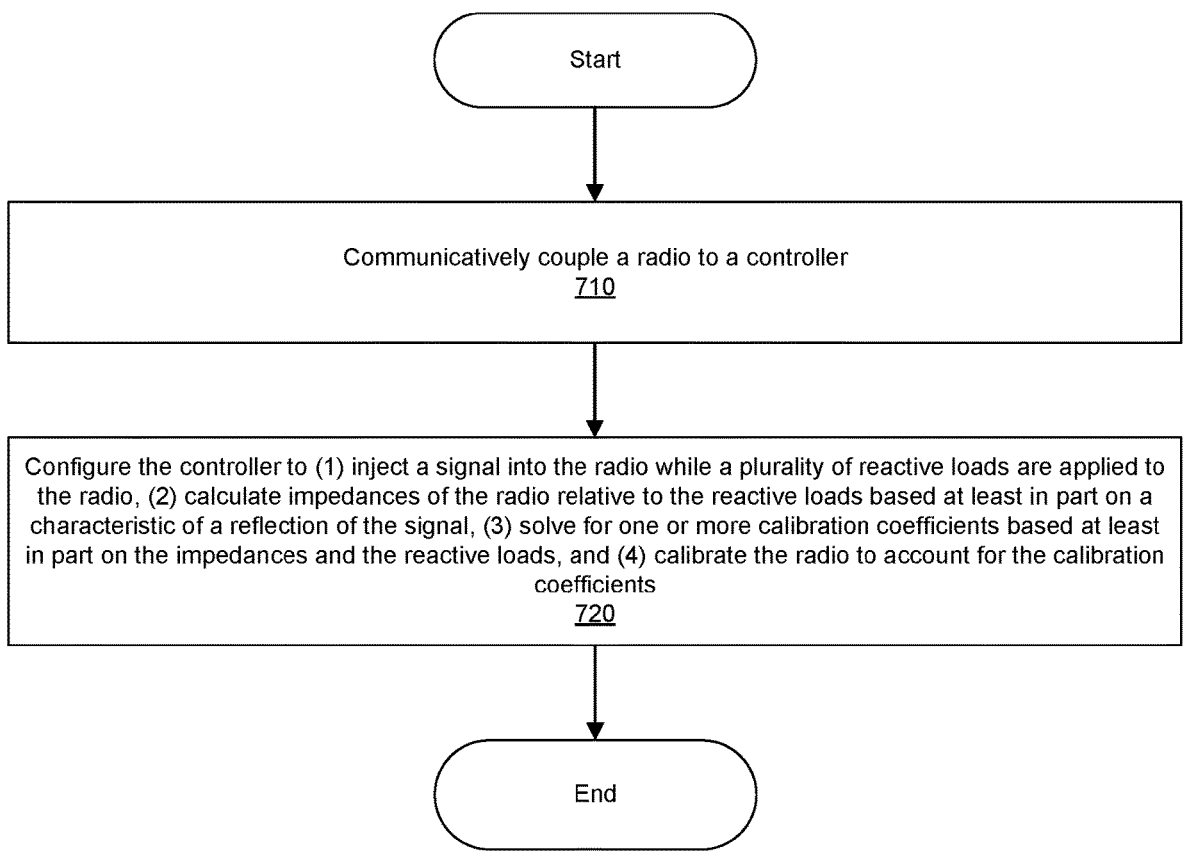
FIG. 5 is a flowchart of an exemplary method for calibrating impedance measurements for closed-loop tuning of wireless devices according to one or more embodiments of this disclosure.

FIG. 5 is a flow diagram of an exemplary method 700 for calibrating impedance measurements for closed-loop tuning of wireless devices. In one example, the steps shown in FIG. 7 may be performed during the manufacture and/or assembly of a radio and/or a wearable device. Additionally or alternatively, the steps shown in FIG. 7 may incorporate and/or involve various sub-steps and/or variations consistent with one or more of the descriptions provided above in connection with FIGS. 1-6.

Figure 6:
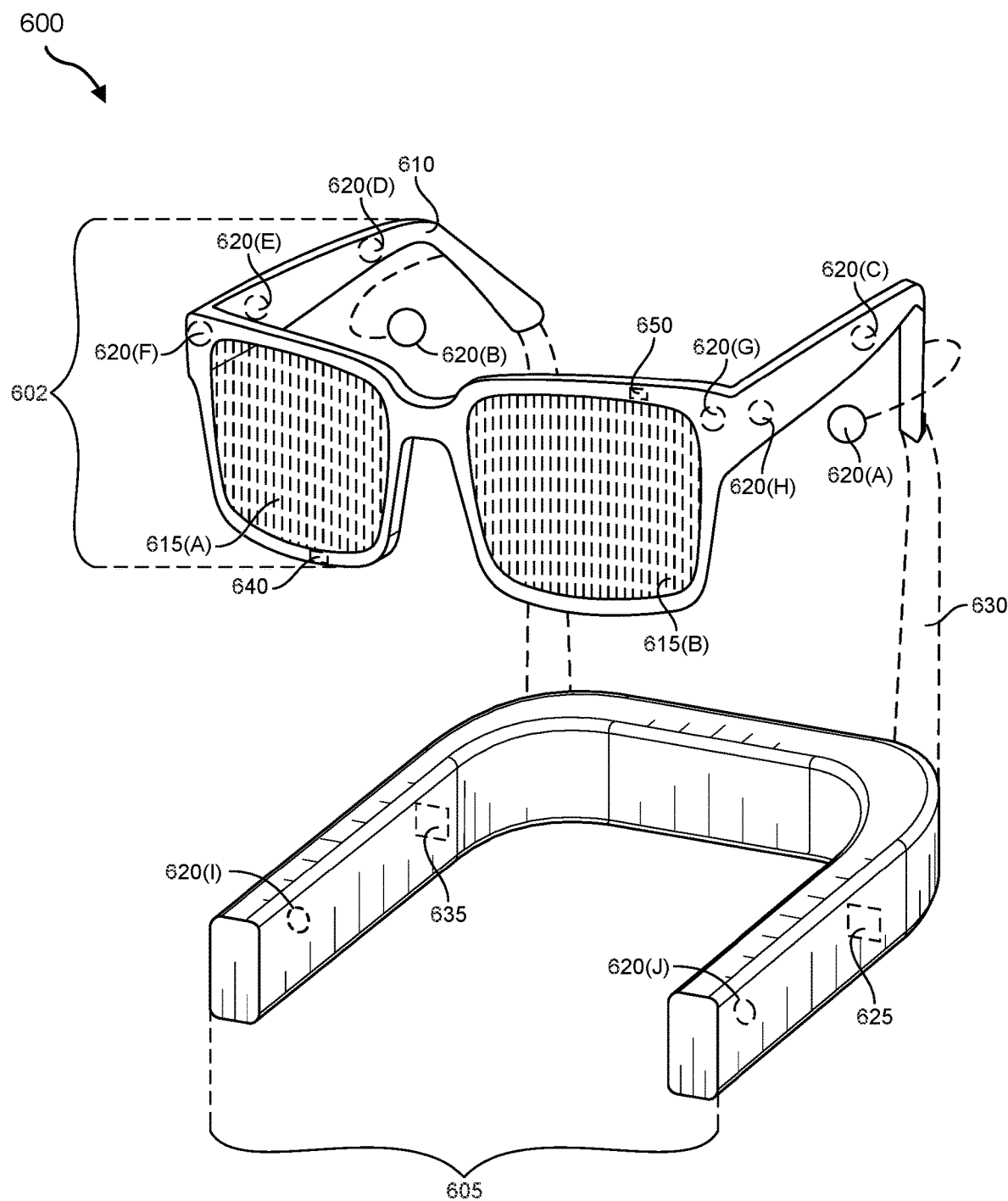
FIG. 6 is an illustration of exemplary augmented-reality system that may be used in connection with embodiments of this disclosure.
Figure 7:
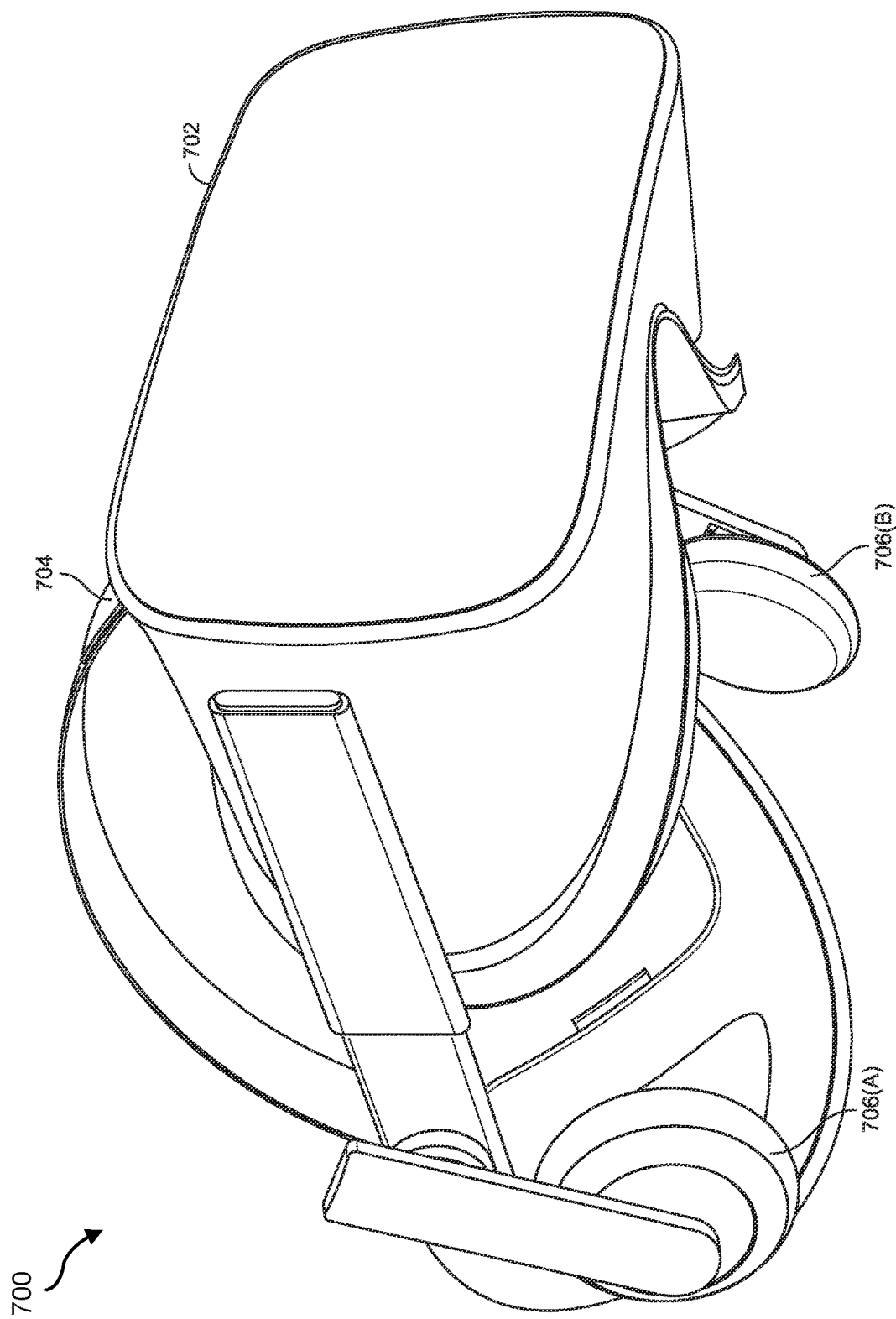
FIG. 7 is an illustration of an exemplary virtual-reality system that may be used in connection with embodiments of this disclosure.

As illustrated in FIG. 7, method 700 may include and/or involve the step of installing a tuner that tunes a radio in a wearable device (710). Step 710 may be performed in a variety of ways, including any of those described above in connection with FIGS. 1-6. For example, a wearable equipment manufacturer may install a tuner that tunes a radio in a wearable device.

In some examples, method 700 may also include and/or involve the step of coupling a controller to the tuner (720). Step 720 may be performed in a variety of ways, including any of those described above in connection with FIGS. 1-6. For example, the wearable equipment manufacturer may couple the controller to the tuner. In one example, the wearable equipment manufacturer may install a modem or one or more additional components between the controller and the tuner.

In some examples, method 700 may also include and/or involve the step of configuring the controller to (1) select a tuner code based at least in part on telemetry data indicative of a certain use-case scenario and (2) cause the tuner to tune the radio by applying the tuner code to achieve a certain state of the radio (730). Step 730 may be performed in a variety of ways, including any of those described above in connection with FIGS. 1-6. For example, the wearable equipment manufacturer may configure the controller to (1) select a tuner code based at least in part on telemetry data indicative of a certain use-case scenario and (2) cause the tuner to tune the radio by applying the tuner code to achieve a certain state of the radio.

EXAMPLE EMBODIMENTS

Example 1: A system comprising (1) a tuner configured to tune a radio and (2) a controller communicatively coupled to the tuner, wherein the controller is configured to (1) select a tuner code to apply to the tuner based at least in part on telemetry data indicative of a certain use-case scenario and (2) cause the tuner to tune the radio by applying the tuner code to achieve a certain state of the radio.

Example 2: The system of Example 1, further comprising a modem communicatively coupled between the controller and the tuner, wherein (1) the modem is configured to provide one or more measurements about a communication link involving the radio to the controller and (2) the telemetry data comprises the measurements about the communication link.

Example 3: The system of Example 1 or 2, wherein the controller directs the modem to apply the tuner code to achieve the certain state of the radio.

Example 4: The system of any of Examples 1-3, wherein the measurements comprise at least one of (1) a Reference Signal Received Power (RSRP) measurement of the communication link, (2) a Reference Signal Received Quality (RSRQ) measurement of the communication link, (3) a Received Signal Strength Indicator (RSSI) measurement of the communication link, or (4) a Signal-to-Noise Ratio (SNR) of the communication link.

Example 5: The system of any of Examples 1-4, further comprising (1) a wearable device that incorporates the tuner and the controller and (2) one or more sensors that are incorporated in the wearable device and communicatively coupled to the controller, wherein the sensors are configured to (1) generate sensor data about a state of the wearable device and (2) provide the sensor data to the controller. The telemetry data comprises the sensor data.

Example 6: The system of any of Examples 1-5, wherein the sensors comprise at least one of (1) a touch sensor, (2) a vibration sensor, (3) a pressure sensor, (4) an accelerometer, (5) a gyroscope, or (6) a transducer.

Example 7: The system of any of Examples 1-6, further comprising a storage device configured to store a table of tuner codes mapped to indexing data, and wherein the controller is configured to (1) search the table of tuner codes for any tuner code that corresponds to the certain use-case scenario and (2), during the search, identify the tuner code as corresponding to the certain use-case scenario by matching the telemetry data to the indexing data of the tuner code.

Example 8: The system of any of Examples 1-7, wherein the controller is configured to (1) identify a subset of the tuner codes stored in the table based at least in part on the telemetry data, the subset of tuner codes comprising the tuner code, (2) sweep across the subset of the tuner codes to test different states of the radio when the subset of tuner codes are applied, (3) measure one or more performance indicators of the tuner during the sweep across the subset of tuner codes, and (4) determine that the tuner code is an optimal selection for the tuner based at least in part on the performance indicators.

Example 9: The system of any of Examples 1-8, wherein the controller is configured to update the table to prioritize one of the tuner codes over another one of the tuner codes for the certain use-case scenario based at least in part on a previous performance of the one of the tuner codes.

Example 10: The system of any of Examples 1-9, wherein the controller is configured to select the tuner code without considering a Voltage Standing Wave Ratio (VSWR) of the radio or relying on a VSWR detector.

Example 11: The system of any of Examples 1-10, wherein the controller is configured to (1) identify the certain use-case scenario based at least in part on the telemetry data, (2) identify a frequency band of the radio that corresponds to the certain use-case scenario, and (3) select the tuner code to apply to the tuner based at least in part on the frequency band that corresponds to the certain use-case scenario.

Example 12: The system of any of Examples 1-11, wherein the controller is configured to (1) identify a model of at least one component of the radio and (2) select the tuner code to apply to the tuner based at least in part on the model of the component of the radio.

Example 13: The system of any of Examples 1-12, wherein the controller is configured to (1) detect an event that triggers a modification to the tuner and (2) select the tuner code to apply to the tuner in response to detecting the event.

Example 14: The system of any of Examples 1-13, further comprising a wearable device that incorporates the tuner and the controller, and wherein the event comprises a position change of the wearable device.

Example 15: The system of any of Examples 1-14, further comprising a wearable device that (1) incorporates the tuner and the controller and (2) is dimensioned to be donned by a user, and wherein the certain use-case scenario comprises at least one of (1) the user dons the wearable device on a wrist, (2) the user holds the wearable device with one or more fingers, (3) the user performs a certain gesture while donning the wearable device, (4) the wearable device is operating in free space, or (5) the wearable device is operating with a certain accessory.

Example 16: A wearable device comprising (1) a tuner configured to tune a radio and (2) a controller communicatively coupled to the tuner, wherein the controller is configured to (1) select a tuner code to apply to the tuner based at least in part on telemetry data indicative of a certain use-case scenario and (2) causes the tuner to tune the radio by applying the tuner code to achieve a certain state of the radio.

Example 17: The wearable device of claim 16, further comprising a modem communicatively coupled between the controller and the tuner, wherein (1) the modem is configured to provide one or more measurements about a communication link involving the radio to the controller and (2) the telemetry data comprises the measurements about the communication link.

Example 18: The wearable device of claim 17, wherein the controller directs the modem the modem to apply the tuner code to achieve the certain state of the radio.

Example 19: The wearable device of claim 17, wherein the measurements comprise at least one of (1) a Reference Signal Received Power (RSRP) measurement of the communication link, (2) a Reference Signal Received Quality (RSRQ) measurement of the communication link, (3) a Received Signal Strength Indicator (RSSI) measurement of the communication link, or (4) a Signal-to-Noise Ratio (SNR) of the communication link.

Example 20: A method comprising (1) installing a tuner that tunes a radio in a wearable device, (2) coupling a controller to the tuner, and (3) configuring the controller to (A) select a tuner code to apply to the tuner based at least in part on telemetry data indicative of a certain use-case scenario and (B) cause the tuner to tune the radio by applying the tuner code to achieve a certain state of the radio.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-620(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620(G), and 620(H), which may be positioned at various locations on frame 610, and/or acoustic transducers 620(I) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality system 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented-reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(1) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620

(D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 600 and/or virtual-reality system 700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 600 and 700 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 8:
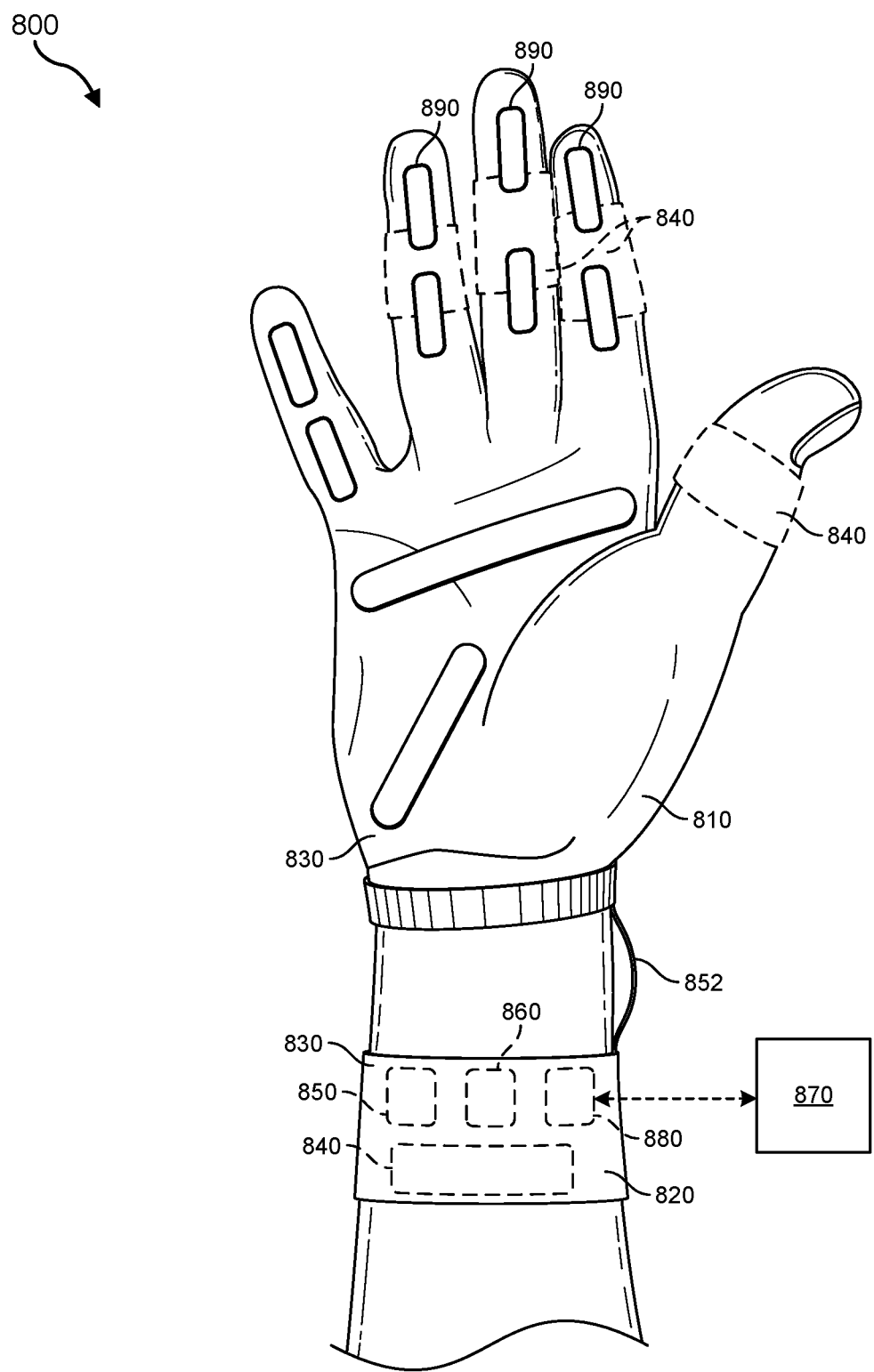
FIG. 8 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 8 illustrates a vibrotactile system 800 in the form of a wearable glove (haptic device 810) and wristband (haptic device 820). Haptic device 810 and haptic device 820 are shown as examples of wearable devices that include a flexible, wearable textile material 830 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 840 may be positioned at least partially within one or more corresponding pockets formed in textile material 830 of vibrotactile system 800. Vibrotactile devices 840 may be positioned in locations to provide a vibrating sensation (e.g., haptic feedback) to a user of vibrotactile system 800. For example, vibrotactile devices 840 may be positioned against the user's finger(s), thumb, or wrist, as shown in FIG. 8. Vibrotactile devices 840 may, in some examples, be sufficiently flexible to conform to or bend with the user's corresponding body part(s).

A power source 850 (e.g., a battery) for applying a voltage to the vibrotactile devices 840 for activation thereof may be electrically coupled to vibrotactile devices 840, such as via conductive wiring 852. In some examples, each of vibrotactile devices 840 may be independently electrically coupled to power source 850 for individual activation. In some embodiments, a processor 860 may be operatively coupled to power source 850 and configured (e.g., programmed) to control activation of vibrotactile devices 840.

Vibrotactile system 800 may be implemented in a variety of ways. In some examples, vibrotactile system 800 may be a standalone system with integral subsystems and components for operation independent of other devices and systems. As another example, vibrotactile system 800 may be configured for interaction with another device or system 870. For example, vibrotactile system 800 may, in some examples, include a communications interface 880 for receiving and/or sending signals to the other device or system 870. The other device or system 870 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 880 may enable communications between vibrotactile system 800 and the other device or system 870 via a wireless (e.g., Wi-Fi, BLUETOOTH, cellular, radio, etc.) link or a wired link. If present, communications interface 880 may be in communication with processor 860, such as to provide a signal to processor 860 to activate or deactivate one or more of the vibrotactile devices 840.

Vibrotactile system 800 may optionally include other subsystems and components, such as touch-sensitive pads 890, pressure sensors, motion sensors, position sensors, lighting elements, and/or user interface elements (e.g., an on/off button, a vibration control element, etc.). During use, vibrotactile devices 840 may be configured to be activated for a variety of different reasons, such as in response to the user's interaction with user interface elements, a signal from the motion or position sensors, a signal from the touch-sensitive pads 890, a signal from the pressure sensors, a signal from the other device or system 870, etc.

Although power source 850, processor 860, and communications interface 880 are illustrated in FIG. 8 as being positioned in haptic device 820, the present disclosure is not so limited. For example, one or more of power source 850, processor 860, or communications interface 880 may be positioned within haptic device 810 or within another wearable textile.

Figure 9:
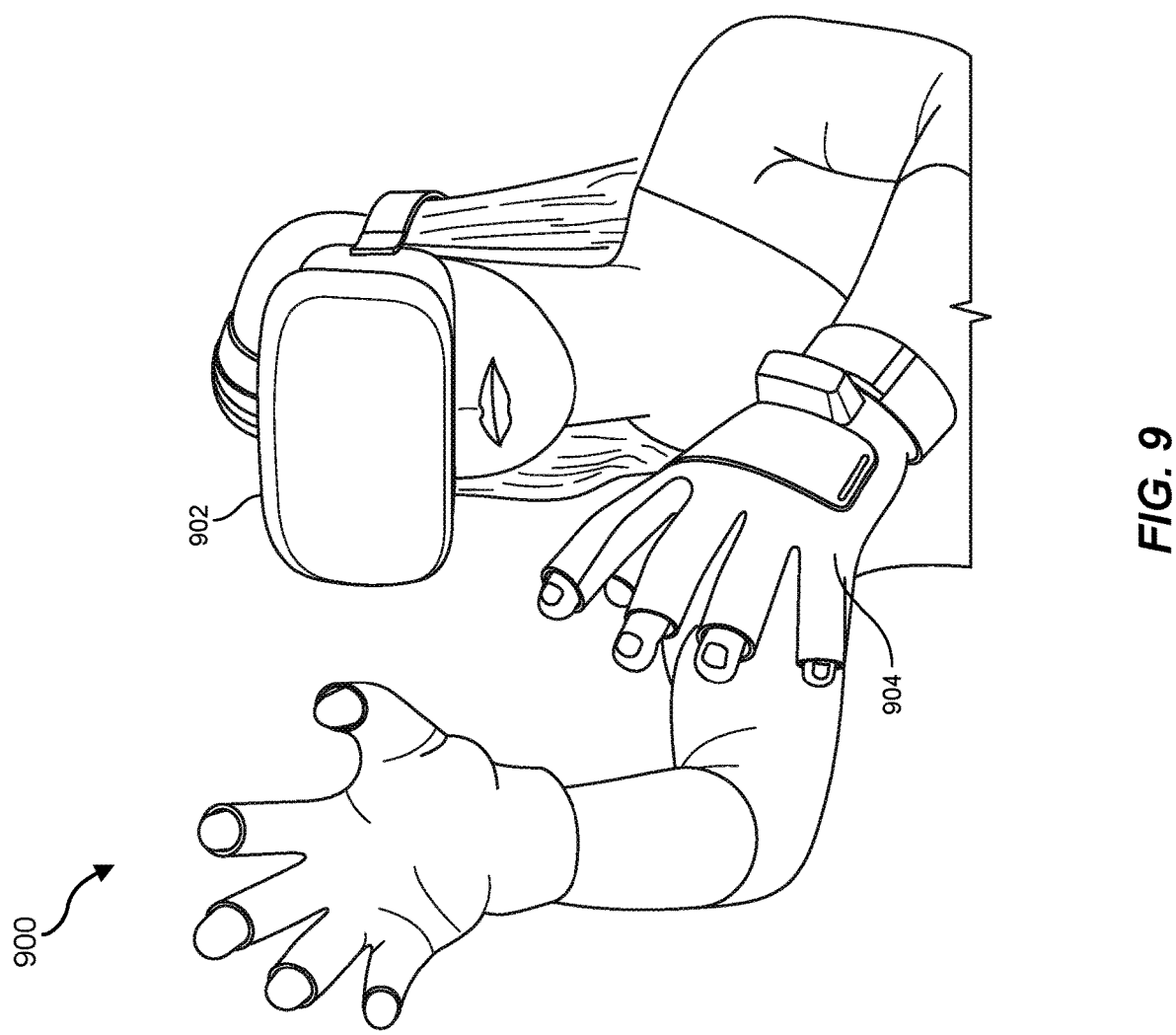
FIG. 9 is an illustration of an exemplary virtual-reality environment according to embodiments of this disclosure.

Haptic wearables, such as those shown in and described in connection with FIG. 8, may be implemented in a variety of types of artificial-reality systems and environments. FIG. 9 shows an example artificial-reality environment 900 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 902 generally represents any type or form of virtual-reality system, such as virtual-reality system 700 in FIG. 7. Haptic device 904 generally represents any type or form of wearable device, worn by a user of an artificial-reality system, that provides haptic feedback to the user to give the user the perception that he or she is physically engaging with a virtual object. In some embodiments, haptic device 904 may provide haptic feedback by applying vibration, motion, and/or force to the user. For example, haptic device 904 may limit or augment a user's movement. To give a specific example, haptic device 904 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 904 to send action requests to a console. Examples of action requests include, without limitation, requests to start an application and/or end the application and/or requests to perform a particular action within the application.

Figure 10:
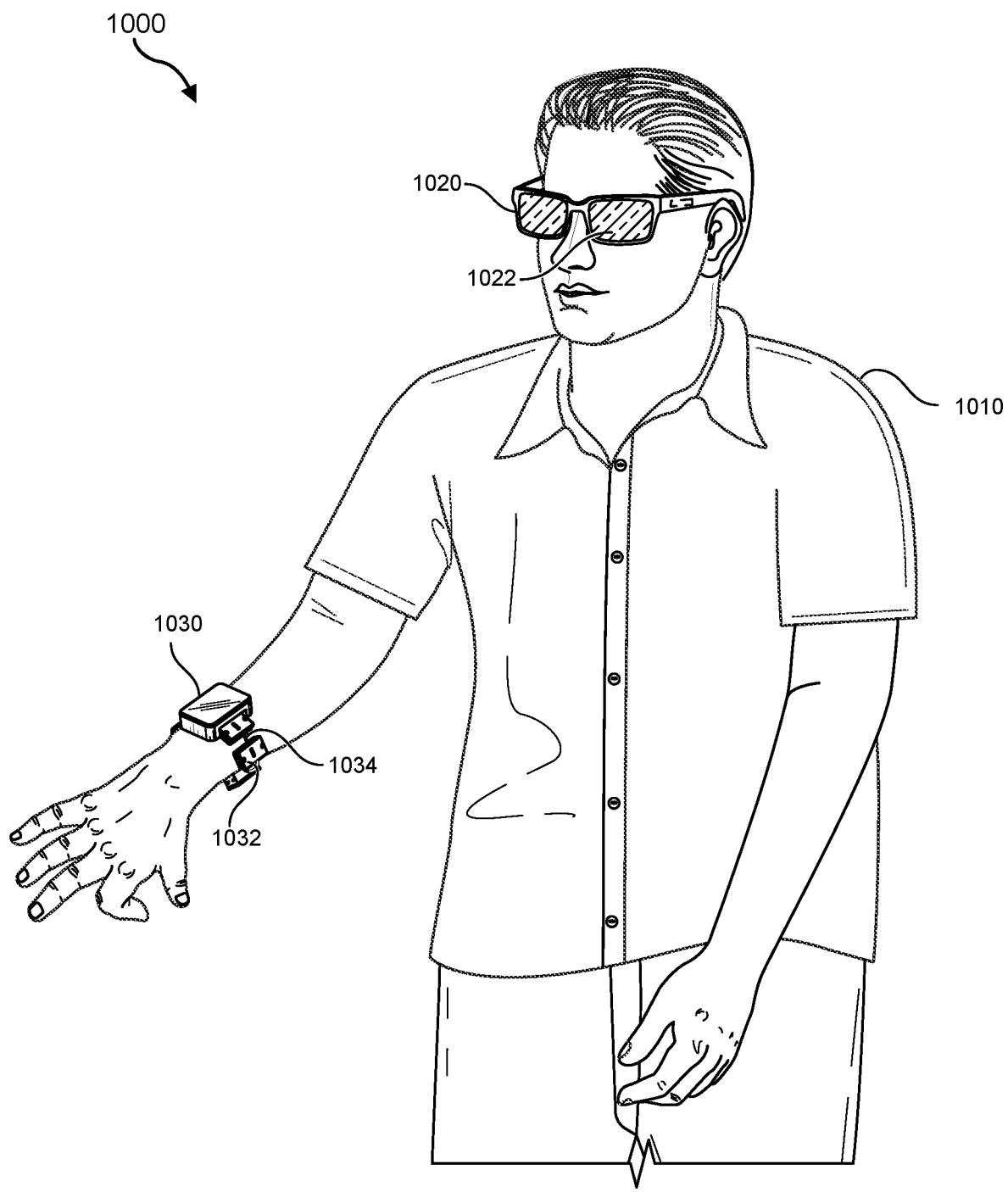
FIG. 10 is an illustration of an exemplary augmented-reality environment according to embodiments of this disclosure.

While haptic interfaces may be used with virtual-reality systems, as shown in FIG. 9, haptic interfaces may also be used with augmented-reality systems, as shown in FIG. 10. FIG. 10 is a perspective view of a user 1010 interacting with an augmented-reality system 1000. In this example, user 1010 may wear a pair of augmented-reality glasses 1020 that may have one or more displays 1022 and that are paired with a haptic device 1030. In this example, haptic device 1030 may be a wristband that includes a plurality of band elements 1032 and a tensioning mechanism 1034 that connects band elements 1032 to one another.

One or more of band elements 1032 may include any type or form of actuator suitable for providing haptic feedback. For example, one or more of band elements 1032 may be configured to provide one or more of various types of cutaneous feedback, including vibration, force, traction, texture, and/or temperature. To provide such feedback, band elements 1032 may include one or more of various types of actuators. In one example, each of band elements 1032 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 810, 820, 904, and 1030 may include any suitable number and/or type of haptic transducer, sensor, and/or feedback mechanism. For example, haptic devices 810, 820, 904, and 1030 may include one or more mechanical transducers, piezoelectric transducers, and/or fluidic transducers. Haptic devices 810, 820, 904, and 1030 may also include various combinations of different types and forms of transducers that work together or independently to enhance a user's artificial-reality experience. In one example, each of band elements 1032 of haptic device 1030 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
a radio; and
a controller communicatively coupled to the radio, wherein the controller is configured to:
inject a signal into the radio while a plurality of reactive loads are applied to the radio;
calculate impedances of the radio relative to the reactive loads based at least in part on a characteristic of a reflection of the signal;
solve for one or more calibration coefficients based at least in part on the impedances and the reactive loads; and
calibrate the radio to account for the calibration coefficients.

2. The system of claim 1, wherein the controller is configured to:
inject the signal into the radio while a plurality of resistive loads are applied to the radio;
calculate impedances of the radio relative to the resistive loads based at least in part on the characteristic of the reflection of the signal; and
solve for the calibration coefficients based at least in part on the impedances and the resistive loads.

3. The system of claim 1, wherein the controller is configured to:
compute an average of the calibration coefficients; and
calibrate the radio to account for the average of the calibration coefficients across a range of impedance values represented by a Smith chart.

4. The system of claim 1, wherein:
the radio comprises:
a tuner;
an antenna; and
a transmission line;
the controller is configured to calibrate the radio by directing the tuner to apply at least one setting that accounts for the calibration coefficients to achieve improved impedance matching between the antenna and the transmission line.

5. The system of claim 1, further comprising a test board equipped with the reactive loads; and
wherein the controller is configured to:
inject the signal into the radio while a first reactive load included in the reactive loads is applied to the radio via the test board;

measure the characteristic of the reflection of the signal relative to the first reactive load; and calculate a first impedance of the radio relative to the first reactive load based at least in part on the characteristic of the reflection of the signal.

6. The system of claim 5, wherein the controller is configured to:

inject the signal into the radio while a second reactive load included in the reactive loads is applied to the radio via the test board;

measure the characteristic of the reflection of the signal relative to the second reactive load; and calculate a second impedance of the radio relative to the second reactive load based at least in part on the characteristic of the reflection of the signal.

7. The system of claim 6, wherein the first reactive load and the second reactive load comprise reactances that are opposite one another on a Smith chart.

8. The system of claim 1, wherein the characteristic of the reflection of the signal comprises at least one of:

an amplitude of the reflection of the signal; and a phase of the reflection of the signal.

9. The system of claim 1, wherein the controller is configured to calculate the impedances of the radio relative to the reactive loads based at least in part on:

a characteristic of the signal; and the characteristic of the reflection of the signal.

10. The system of claim 1, wherein the reactive loads each comprise at least one of:

a purely reactive load; or a load that includes a resistive component and a reactive component.

11. The system of claim 1, wherein:

the calibration coefficients comprise a set of polynomial basis functions that represent non-linear errors present in the impedances; and the controller is configured to:

create the set of polynomial basis functions by applying a curve-fitting algorithm to the non-linear errors present in the impedances; and tuning the radio by applying one or more settings that correspond to the set of polynomial basis functions.

12. The system of claim 11, wherein the set of polynomial basis functions comprise a set of Zernike polynomials.

13. The system of claim 1, further comprising a nonvolatile memory device communicatively coupled to the controller; and wherein the controller is configured to store the calibration coefficients in the nonvolatile memory device to facilitate compensating for a non-linearity of the radio at a subsequent time.

14. The system of claim 1, wherein the controller is configured to model a non-linearity of the radio via calibration coefficients.

15. The system of claim 14, wherein the controller is configured to model the non-linearity of the radio by:

determining non-linear errors present in the impedances; and translating the impedances from measured values to projected values on a Smith chart via the calibration coefficients.

16. A wireless device comprising:

a radio; and a controller communicatively coupled to the radio, wherein the controller is configured to:

inject a signal into the radio while a plurality of reactive loads are applied to the radio;

calculate impedances of the radio relative to the reactive loads based at least in part on a characteristic of a reflection of the signal;

solve for one or more calibration coefficients based at least in part on the impedances and the reactive loads; and calibrate the radio to account for the calibration coefficients.

17. The wireless device of claim 16, wherein the controller is configured to:

inject the signal into the radio while a plurality of resistive loads are applied to the radio;

calculate impedances of the radio relative to the resistive loads based at least in part on the characteristic of the reflection of the signal; and solve for the calibration coefficients based at least in part on the impedances and the resistive loads.

18. The wireless device of claim 16, wherein the controller is configured to:

compute an average of the calibration coefficients; and calibrate the radio to account for the average of the calibration coefficients across a range of impedance values represented by a Smith chart.

19. The wireless device of claim 16, wherein:

the radio comprises:

a tuner;

an antenna; and a transmission line;

the controller is configured to calibrate the radio by directing the tuner to apply at least one setting that accounts for the calibration coefficients to achieve improved impedance matching between the antenna and the transmission line.

20. A method comprising:

communicatively coupling a radio to a controller; and configuring the controller to:

inject a signal into the radio while a plurality of reactive loads are applied to the radio;

calculate impedances of the radio relative to the reactive loads based at least in part on a characteristic of a reflection of the signal;

solve for one or more calibration coefficients based at least in part on the impedances and the reactive loads; and calibrate the radio to account for the calibration coefficients.

* * * * *